United States Patent [19]
Walters

[11] Patent Number: 5,718,401
[45] Date of Patent: Feb. 17, 1998

[54] SUPPORT STAND ASSEMBLY FOR CARRYING CASE

[75] Inventor: Anthony R. Walters, Overland Park, Kans.

[73] Assignee: Worldwide Billiards Concepts, Inc., Ottawa, Kans.

[21] Appl. No.: 559,499

[22] Filed: Nov. 15, 1995

[51] Int. Cl.⁶ .................................................. A47G 23/02
[52] U.S. Cl. ........................................... 248/150; 248/96
[58] Field of Search .............................. 348/96, 688, 169, 348/168, 167, 150; 206/315.3, 315.4, 315.6, 315.7, 315.8

[56] References Cited

U.S. PATENT DOCUMENTS

| | | | |
|---|---|---|---|
| 846,552 | 3/1907 | Collins | 348/688 |
| 1,181,007 | 4/1916 | Henneberg | 248/96 |
| 1,197,298 | 9/1916 | McGregor | 248/96 |
| 1,752,114 | 3/1930 | Shaw | 248/96 |
| 2,408,777 | 10/1946 | Holbrook | 248/96 |
| 3,195,844 | 7/1965 | Roepke | 248/96 |
| 4,506,854 | 3/1985 | Kim | 248/96 |
| 5,156,366 | 10/1992 | Anderson | 248/96 |
| 5,407,155 | 4/1995 | Chung | 248/168 |

*Primary Examiner*—Ramon O. Ramirez
*Assistant Examiner*—Gwendolyn W. Baxter
*Attorney, Agent, or Firm*—Hovey, Williams, Timmons & Collins

[57] ABSTRACT

A support stand assembly mountable to a carrying case for sports, music, and recreational equipment is provided and includes support structure, rack structure and a linkage assembly interconnecting the support and rack structure. The linkage assembly is operable for causing coordinated synchronous movement of the support and rack structure between a stowed and extended position. In the stowed position, the support and rack structure assume a compact retracted position so as not to significantly protrude outwardly from the carrying case. In the extended position, the support structure supports the case in a generally upright position. In the extended position, the rack structure is extended to receive and support at least one elongated item of equipment, such as a cue stick, in a generally upright position.

11 Claims, 2 Drawing Sheets

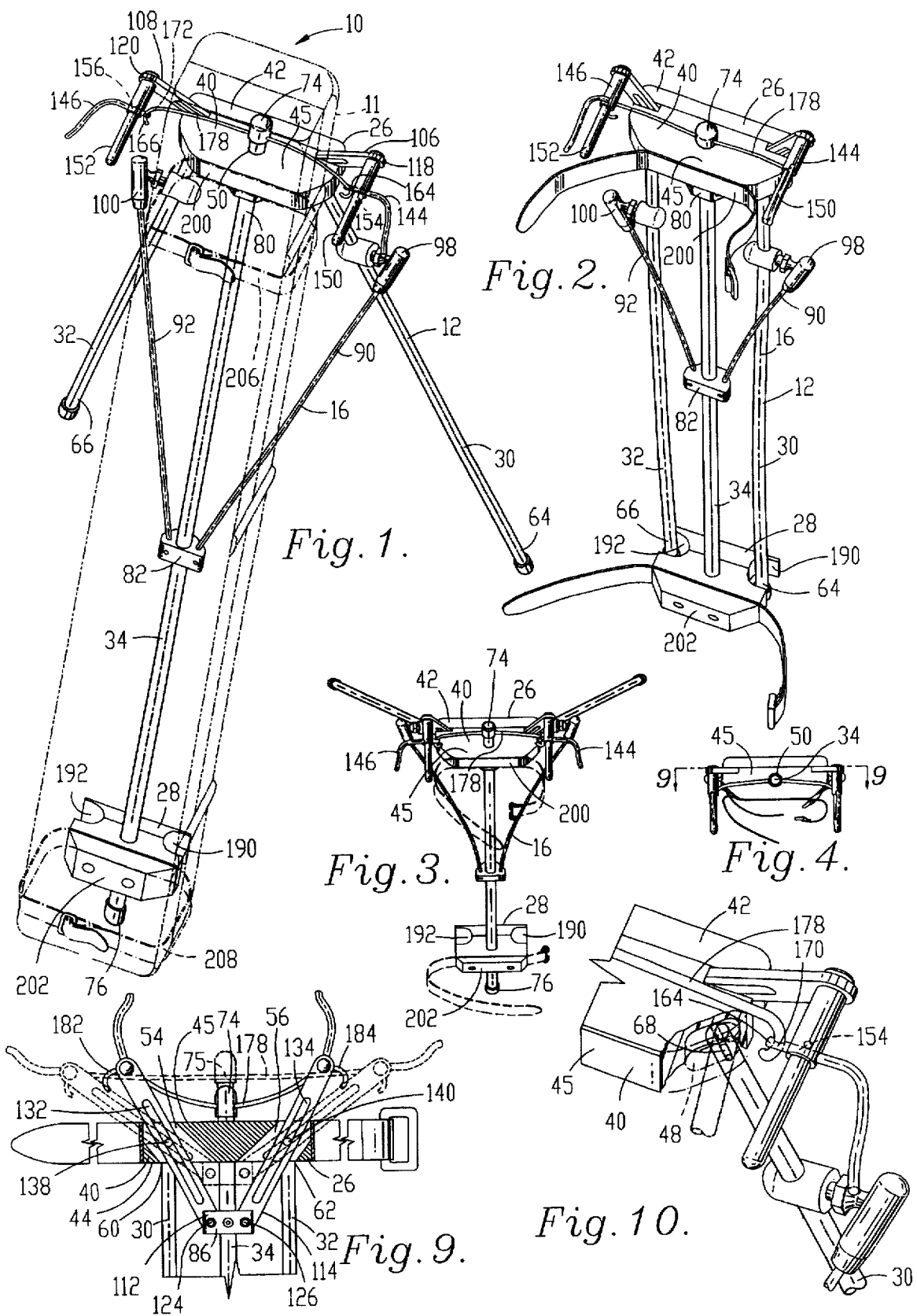

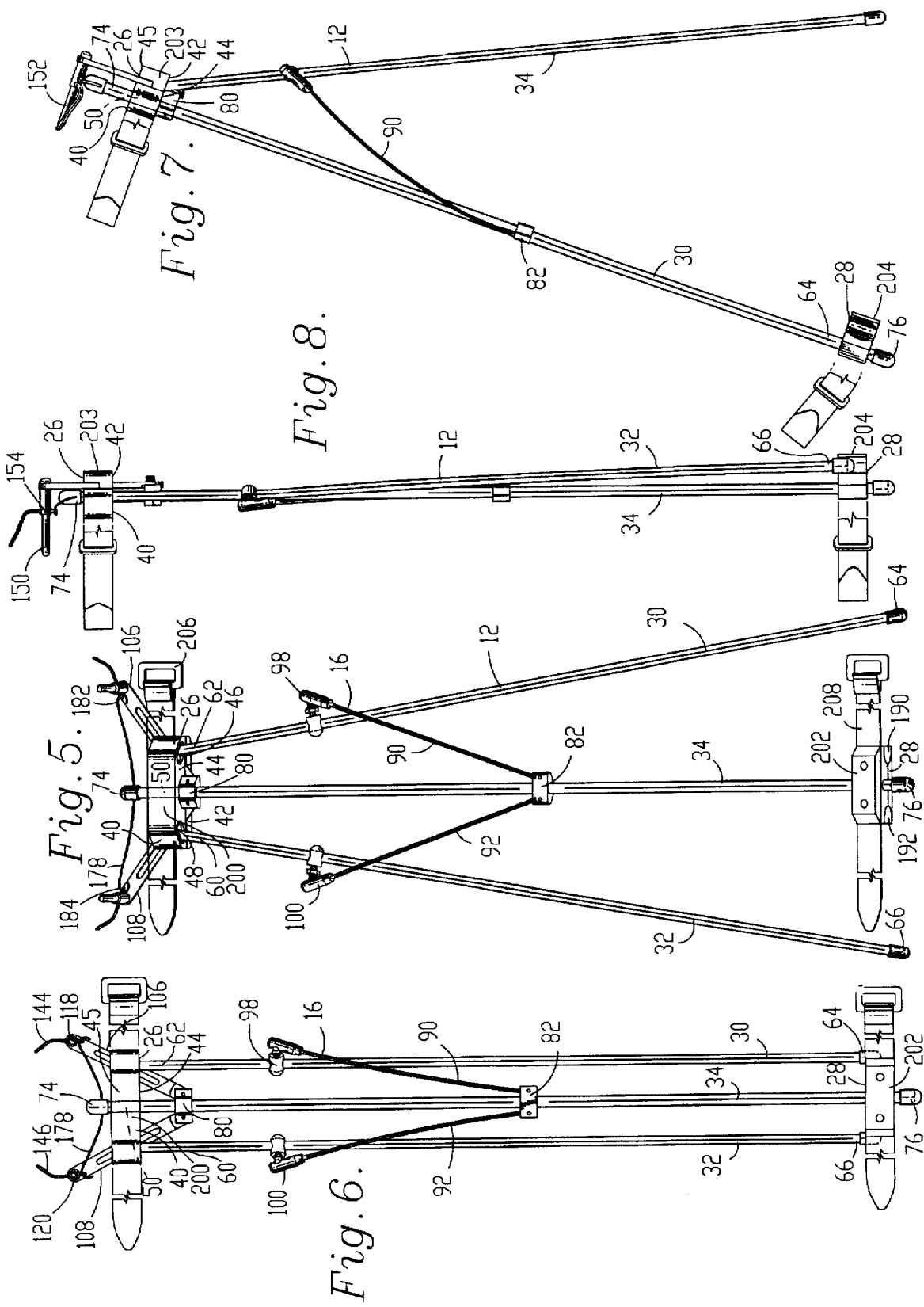

SUPPORT STAND ASSEMBLY FOR CARRYING CASE

BACKGROUND OF THE INVENTION

1. Field of the Invention

This invention relates to a support stand assembly for sports, music, and recreational equipment carrying case of simple yet highly effective construction which has numerous advantages including easy portability, compactness. The assembly is operable for causing coordinated synchronous movement of support structure and rack structure between a stowed position and an extended position. In the extended position, the support structure supports the case in a generally upright position and the rack structure is oriented to receive and support equipment, such as a cue stick, in a generally upright position. More particularly, it is concerned with a support stand having collapsible case support and rack structure mountable to the case, and a linkage assembly interconnecting the rack and support structure and operable for causing coordinated synchronous movement of the support and rack structure between the stowed and extended positions.

2. Description of the Prior Art

People who use sports, music, and recreational equipment often transport and store the equipment in a carrying case. Problems are typically encountered, however, when the case is carried to a location where the equipment is to be removed from the case and used. For example, in public pool halls, space is typically limited and provisions are often inadequate for stowing carrying cases and cue sticks when not in use. If numerous players are present at a particular pool hall, cue stick cases, which are cumbersome, take up valuable space in the recreational area. Further, cue sticks not in use are often leaned up against objects or vertical surfaces and are subject to being knocked over and easily damaged.

Similar problems are encountered with respect to fishing equipment. That is, when not in use at a fishing site, fishing poles are often leaned up against objects or laid on the ground, again subjecting the equipment to damage.

SUMMARY OF THE INVENTION

The problems outlined above are in large measure solved by the support assembly in accordance with the present invention. That is to say, a support stand assembly hereof is of lightweight, compact construction, serves both as a case stand and as an equipment rack, and is specially designed to provide a storage assembly for a carrying case for sports, music or recreational equipment when the equipment is outside the carrying case but not in use.

In particular preferred forms, a support stand for a cue stick carrying case includes an assembly mountable to the case having support structure and cue stick rack structure. A linkage assembly is provided that interconnects the support and rack structure and is operable for causing coordinated synchronous movement of the support and rack structure between a stowed and extended position. In the stowed position, the support and rack structure assume a compact retracted position so as not to significantly protrude outwardly from the carrying case. In the extended position, the support structure supports the case in a generally upright position and making the case readily accessible. Further, in the extended position, the rack structure is extended in a position to receive and support at least one cue stick in a generally upright position.

The support structure generally includes an upper base having a pair of elongated support legs swingably coupled at one end to the base and having opposite ground engaging ends. An actuator leg is coupled to the base to provide for slidable axial movement relative to the base. The actuator leg is further operable by the application of downward force to the upper end of the cue stick case to cause the coordinated synchronous movement of the support and rack structure between stowed and extended positions.

The linkage assembly includes a pair of tension links connected at one end to the actuator leg and at the opposite end to the support legs. The linkage assembly operatively interconnects the actuator legs to the support legs to make the support legs move outwardly from the actuator legs in response to the application of downward force on the upper end of the cue stick carrying case. The tension links are further configured to provide a self-closing biasing force to cause the actuator leg and support legs to move from the extended to the stowed position when the assembly is lifted off the ground.

BRIEF DESCRIPTION OF THE DRAWINGS

FIG. 1 is a front prospective view of the support stand assembly in accordance with the invention shown in the extended position with a cue stick carrying case mounted thereto in a generally upright position;

FIG. 2 is a prospective view of the support stand assembly in the stowed position showing the support legs received by the lower base notches into a stowed position;

FIG. 3 is a top plan view showing the support stand assembly in the extended position with the cue stick rack in a cue stick receiving position;

FIG. 4 is a top plan view of the support stand assembly showing the cue stick rack in the general vertically, stowed position;

FIG. 5 is a front elevational view of the support stand assembly stand in the extended position;

FIG. 6 is a front elevational view of the support stand assembly showing the support and cue stick rack structure in the stowed position;

FIG. 7 is a side elevational view of the support stand assembly showing the support structure in the extended position;

FIG. 8 is a side elevational view of the support stand assembly showing the support stand assembly in the stowed position;

FIG. 9 is a fragmentary view of the support stand assembly showing the cue stick rack structure in the stowed position and in the extended position; and FIG. 10 is a fragmentary isometric view of the base illustrating the internal construction of the structure which permits swingable movement of the support legs relative to the base.

DETAILED DESCRIPTION OF THE PREFERRED EMBODIMENTS

Referring now to the drawings, a support stand assembly 10 in accordance with the invention broadly includes case support structure 12, cue stick rack structure 14 and a linkage assembly 16.

In the preferred embodiment, case support structure 12 includes an upper base 26, a lower base 28, a pair of support legs 30 and 32, and an elongated actuator leg 34.

Upper base 26 is a two-piece assembly including a front plate-like member 40 and rear member 42. Front member 40 presents a lower face 44 and an upper face 45. Lower face 44 presents downwardly opening right and left support leg sockets 46 and 48. Upper base member 40 further includes an opening 50 extending between lower and upper faces 44 and 45 for receiving actuator leg 34. Front member 40 and rear member 44, when joined as shown in sliding engagement in FIGS. 1 and 2, cooperate to define right and left rack structure slots 54 and 56 extending between the lower and upper faces 44 of front member 40.

Referring now to FIGS. 5 and 10, support legs 30 and 32 are swingably coupled at upper ends 60 and 62, respectively, to front member 40 by means of right and left pivot pins 68 and 70 extending radially from leg upper ends 60 and 62 which are pivotably affixed in said slots 54 and 56. Right and left pins 68 and 70 permit the support legs 30 and 31 to swingably pivot with respect to upper base 26.

Actuator leg 34 includes an upper end 74 and ground engaging end 76. Upper end 74 of actuator leg 34 is slidably received by opening 50 of upper base 26 to permit slidable axial movement of the actuator leg 34 relative to base 26.

An upper bracket 80 and a lower bracket 82 are secured to actuator leg 34, as best shown in FIG. 6. Upper bracket 80 presents rear face 86 and is affixed to upper end 74 of the actuator leg 34 so that the distance between upper bracket 80 and the ground engaging end 76 is about the same as the length of the support legs 30, 31. So attached to the actuator leg 34, upper bracket 80 acts as a lower stop against the axial sliding movement of the actuator leg 34 relative to upper base 26. Actuator leg 34 is moveable between a stowed retracted position, shown in FIG. 8, and an extended position, shown in FIG. 7.

Linkage assembly 16 includes right and left linkage rods 90 and 92 attached at one end to lower bracket 82 and attached at opposite ends to right and left swivel connections 98, 100, each affixed to right and left support legs 30, 31, respectively. Swivel connectors 98, 100, are ball and socket type connectors and permit a broad range of rotational movement of tension rods 90 and 92 relative to support legs 30, 31, respectively. Rods 90 and 92 are sufficiently flexible, and yet resilient, so that when bowed, as shown in FIGS. 3 and 7, they provide a biasing force between support legs 30, 32, and the actuator leg 34 when the support stand assembly 10 is in the extended position. The biasing force is operable to cause the support structure 12 and rack structure 14 to collapse from the extended position to the stowed position when the assembly is lifted off the ground.

Rack structure 14 includes right and left rigid rack links 106, 108, which include lower ends 112, 114 and upper ends 118, 120, respectively. Lower ends 112, 114, of rack links 106, 108, are pivotally attached to projections 124, 126, extending outwardly from rear face 86 of upper bracket 80, as shown in FIG. 9. Rack links 106, 108, extend through base slots 54, 56, as shown in FIG. 9. Links 106, 108, include right and left link slots 132, 134, which receive projections 138, 140, respectively, that guide the sliding movement of links 106, 108, relative to the upper base 26. As shown in FIG. 9, actuator leg 34 and links 106, 108, are shown in the retracted position and actuator leg 34 and links 106, 108, are shown in phantom in the extended position.

Right and left racks 144, 146, include front opening U-shape structure, which in the preferred embodiment, is in the form of right and left pins 150 and 152, which are rotatably attached at one end to rack link upper ends 118, 120, as best shown in FIGS. 7 and 8. Pins 150, 152, include transverse bore holes 154, 156, for securely receiving one end of right and left L-shape fingers 158 and 160, as best shown in FIGS. 7 and 8. Fingers 158 and 160 extend sufficiently through bore holes 154 and 156 to present stub ends 164 and 166, as shown in FIG. 10. Stub ends 164, 166, are further provided with transverse bore holes 170, 172, respectively.

A cue stick rack spring member 178 is configured with hook-shape outerends 182 and 184 which extend through bore holes 170 and 172 of stub ends 164, 166. The center portion of spring member 178 extends through bore hole 75 of actuator leg upper end 74, as shown in FIG. 9.

When actuator leg 34 is in the extended position, as shown in phantom in FIG. 9, spring member 178 is operable to rotation of right and left racks 144, 146, in opposite directions from the vertical, generally upright stowed position to the outward, generally horizontal, cue stick receiving position.

Lower base 28 includes side opening, leg receiving notches 190, 192, configured to receive the ground engaging ends 64, 66, of support legs 30, 31, when assembly 10 is in the retracted, stowed position, as shown in FIGS. 2 and 6. Upper and lower bases 26, 28, present cue stick case abutment surfaces 200 and 202, respectively. Abutment surfaces 200, 202, cooperate to provide an abutment surface to receive a cue stick case 11 as shown in FIG. 1. Straps 206, 208, may be employed to secure cue stick case 11 to abutment surfaces 200, 202. In the alternative, cue stick case 11 may be secured by fasteners to upper and lower bases 26, 28, by conventional fastener means.

The operation of support stand assembly 10 will now be described. The cue stick case 11 is mounted to the support stand assembly 10 by means of upper and lower straps 206, 208, as shown in FIG. 1. To move the support structure 12 from the extended to the stowed position, stand 1 is simply lifted off the ground by the application of external force which permits right and left rods 90 and 92 to draw actuator leg 34 upwardly through upper base opening 50. At the same time, and in coordinated synchronous movement, support legs 30 and 31 are drawn toward actuator leg 34 until support legs are brought to rest with their ground engaging ends 64, 66, received by lower base notches 190, 192, as shown in FIG. 2. At the same time, the cue stick rack structure 14 is caused to move from its extended position, as shown in FIG. 1, to its retracted stowed position as shown in FIG. 2.

To cause the stand assembly 10 to move between the stowed retracted position and the extended position, external downward force is applied to stand 10, or to a carrying case 11 attached thereto, when oriented in the upright position. The downward force causes the ground engaging end 76 of actuator leg 34 to be brought into contact with the ground, causing the upper base 26 and the support legs 30, 32, attached thereto to move downwardly relative to the upper base 26 until upper bracket 80 abuts against upper base 26, as shown in FIG. 5. This motion, in turn, causes rods 90, 92, to force support legs 30, 32, to move outwardly into the extended position. As support legs 30, 32, move outwardly, the rods 90, 92, are bowed, as shown in FIGS. 3 and 7, creating a biasing force to be created in rods 90, 92. The biasing force is effective to cause the actuator leg 34 and support legs 30, 32, to return to their stowed positions when stand 10 is lifted off the ground.

The movement of the cue stick rack structure 14 between its stowed and extended position will now be described. As shown in FIG. 1, rack structure 14 is in the extended position with right and left racks 144, 146, oriented into a generally horizontal, cue stick receiving position, and are held in that position by means of spring member 178. As actuator leg upper end 74 moves downwardly through opening 50 of upper base 26, rack links 106, 108, are pulled downwardly through link slots 130, 132, and links 106, 108, are guided through this range of motion by projections 138, 140, which are slidably engaged in slots 132, 134. As links 106, 108, are moved downwardly, their upper ends 118, 120, rotate inwardly toward the actuator leg 34 about their lower ends 112, 114.

Right and left racks 144, 146, are rotated from their generally horizontal, extended position to their vertical stowed position by means of spring member 178. As upper end 74 of actuator leg 34 is moved downwardly relative to upper base 26, and link upper ends 118, 120, are rotated inwardly as described above, spring member 178 is drawn into a bowed configuration by actuator leg 34, as shown in FIG. 9, further causing racks 144, 146, to rotate in opposite directions toward one another. A biasing force is created in spring member 178 when it is bowed as shown in FIG. 9, so that the upward motion of actuator leg 34 relative to base 26 causes racks 144, 146, to rotate in opposite directions away from one another.

Apparatus 10 is, in the alternative, suited for use as a support stand for a fishing pole carrying case and as a rack to support a fishing pole standing on end. In a like manner, the assembly 10 is useful as a case stand and equipment rack for any requipment which, when not in its case, can be stored by standing on end. Assembly 10 is thus suited for use with equipment particulary having an elongated configuration such as pool sticks and fishing poles, but also including guns, rifles and golf clubs.

In yet other alternative embodiments, the support stand assembly 10 configured without rack structure 14 may be employed as a support stand assembly for all types of storage cases, including cases used for guitars, tennis equipment, bowling equipment, and the like.

Although preferred forms of the invention have been described above, it is to be recognized that such disclosure is by way of illustration only, and should not be utilized in a limiting sense in interpreting the scope of the present invention. Obvious modifications to the exemplary embodiments as herein above set forth, could be readily made by those skilled in the art without parting from the spirit of the present invention.

The inventor hereby state his intent to rely on the Doctrine of Equivalents to determine and assess the reasonably fair scope of his invention as it pertains to any apparatus not materially departing from but outside the literal scope of the invention as set out in the following claims.

I claim:

1. A support assembly for supporting a carrying case configured for carrying elongated objects, said support assembly comprising:

support structure for attachment to the carrying case;

rack structure operably coupled with said support structure, said rack structure including a rack configured for supporting the elongated objects when the elongated objects are removed from the carrying case; and linkage assembly separate from said rack structure and said rack for interconnecting said rack structure and said support structure and operable for causing coordinated synchronous movement of said support structure and said rack structure between a stowed position in which said support structure and said rack structure are retracted relative to the carrying case and an extended position in which said support structure is extended relative to the carrying case so that it is configured to support the carrying case in a generally upright position and in which said rack structure is extended relative to the carrying case so that said rack is positioned for receiving and supporting the elongated objects in an upright position adjacent the carrying case.

2. A support assembly as set forth in claim 1, said support structure and rack structure moveable to said extended position by application of external force to said linkage assembly, said linkage assembly including spring structure for providing a biasing force to cause said support structure to move from said extended position to said stowed position when the external force is removed.

3. The support assembly as set forth in claim 1, said support structure including:

an upper base, a pair of elongated support legs swingably coupled at one end to said base and having ground engaging ends, and an elongated actuator leg coupled to said base to provide for slidable axial movement of the actuator leg relative to the base, said slidable axial movement operable to cause said coordinated synchronous movement of said support structure and said rack structure.

4. The support assembly as set forth in claim 3, said linkage assembly comprising a pair of tension links connected at one end to said actuator leg and at the other ends to said support legs, respectively, the said links being operable to cause movement of the support legs relative to the actuator leg between said stowed and extended positions when said actuator leg is slidably moved along its axis relative to the base.

5. The support assembly as set forth in claim 3, said linkage assembly comprising a pair of tension links rigidly connected at one end to said actuator leg and pivotally connected at the other end to said support legs, said movement of said support legs relative to said actuator leg from said stowed position to said extended position being caused by the application of external force, said tension links configured to provide a biasing force to cause said actuator leg and said support legs to move from said extended position to said stowed position when the external force is removed.

6. A support assembly as set forth in claim 3, said rack structure including a pair of rigid rack links pivotally connected at one end to said actuator leg, said rack links slidably interconnected to said upper base and including at the opposite ends receiving yokes, said rack links configured so that said slidable axial movement of said actuator leg causes said yokes to move between said stowed position and said receiving and support position.

7. The support assembly as set forth in claim 6, said yokes interconnected to said rack links by swivel structure so that said yokes may be rotated into said stowed position when said structure has been moved into said stowed position.

8. The support assembly as set forth in claim 1, said rack of said rack structure being substantially U-shaped.

9. A support assembly for a cue stick carrying case configured for carrying at least one cue stick, said support assembly comprising:

support structure for attachment to the case; cue stick rack structure operably coupled with said support structure, said cue stick rack structure including a rack configured for supporting the cue stick when the cue stick is removed from the case; and linkage assembly separate from said rack structure and said rack for interconnecting said rack structure and said support structure and operable for causing coordinated synchronous movement of the support structure and rack structure between a stowed position in which the support structure and rack structure are retracted relative to the case and an extended position in which the support structure is extended relative to the case so that it is operable to support the case in a generally upright position and in which the rack structure is extended relative to the case so that said rack is positioned for receiving and supporting the cue stick in an upright position adjacent the carrying case.

10. An apparatus for carrying and supporting elongated objects, said apparatus comprising:

an elongated, carrying case; and a support assembly for supporting said carrying case, said support assembly including support structure for supporting the carrying case, rack structure operably coupled with said support structure, said rack structure including a rack configured for supporting the elongated objects when the elongated objects are removed from the carrying case, and linkage assembly separate from said rack structure and said rack for interconnecting said rack structure and said support structure and operable for causing coordinated synchronous movement of said support structure and said rack structure between a stowed position in which said support structure and said rack structure are retracted relative to the carrying case and an extended position in which said support structure is extended relative to the carrying case so that it supports the carrying case in a generally upright position and in which said rack structure is extended relative to the carrying case so that said rack is positioned for receiving and supporting the elongated objects in an upright position adjacent the carrying case.

11. The support assembly as set forth in claim 10, said rack of said rack structure being substantially U-shaped.

* * * * *